United States Patent [19]

Ducharme

[11] 3,910,491

[45] Oct. 7, 1975

[54] ICE AND SNOW GRIP FOR VEHICLES

[76] Inventor: Jean-Louis Ducharme, 6007 Lafontaine, Montreal 24, Quebec, Canada

[22] Filed: May 29, 1974

[21] Appl. No.: 474,204

[30] Foreign Application Priority Data

May 23, 1974 Canada .............................. 200844

[52] U.S. Cl. ................................................ 238/14
[51] Int. Cl.² ......................................... E01B 23/00
[58] Field of Search .......... 238/14; 152/208; 188/32

[56] References Cited
UNITED STATES PATENTS

| | | | |
|---|---|---|---|
| 1,815,435 | 7/1931 | Harding et al. ....................... | 238/14 |
| 2,975,977 | 3/1961 | Chodacki et al. ..................... | 238/14 |
| 3,357,639 | 12/1967 | Peterson ............................... | 238/14 |
| 3,701,474 | 10/1972 | Weiz .................................... | 238/14 |

Primary Examiner—Lloyd L. King
Assistant Examiner—Richard A. Bertsch
Attorney, Agent, or Firm—Cushman, Darby & Cushman

[57] ABSTRACT

The disclosure herein discloses a grip for a vehicle tire which consists of an elongated body having an inclined ramp portion, a nose portion and two parallel sidewalls tapering to the nose portion; a first series of transverse projections spaced longitudinally along the upper face of the ramp portion and a series of teeth provided longitudinally along the lower edge of each sidewall provide traction between tire and an icy surface. A second series of longitudinally spaced transverse projections along the under face of the ramp portion provides additional gripping action. For use in deep snow, however, the grip is engagedly combined with a similarly-shaped elongated body, the latter serving as the tire-engaging part of the combined device and the grip serving only as the snow traction part thereof.

10 Claims, 6 Drawing Figures

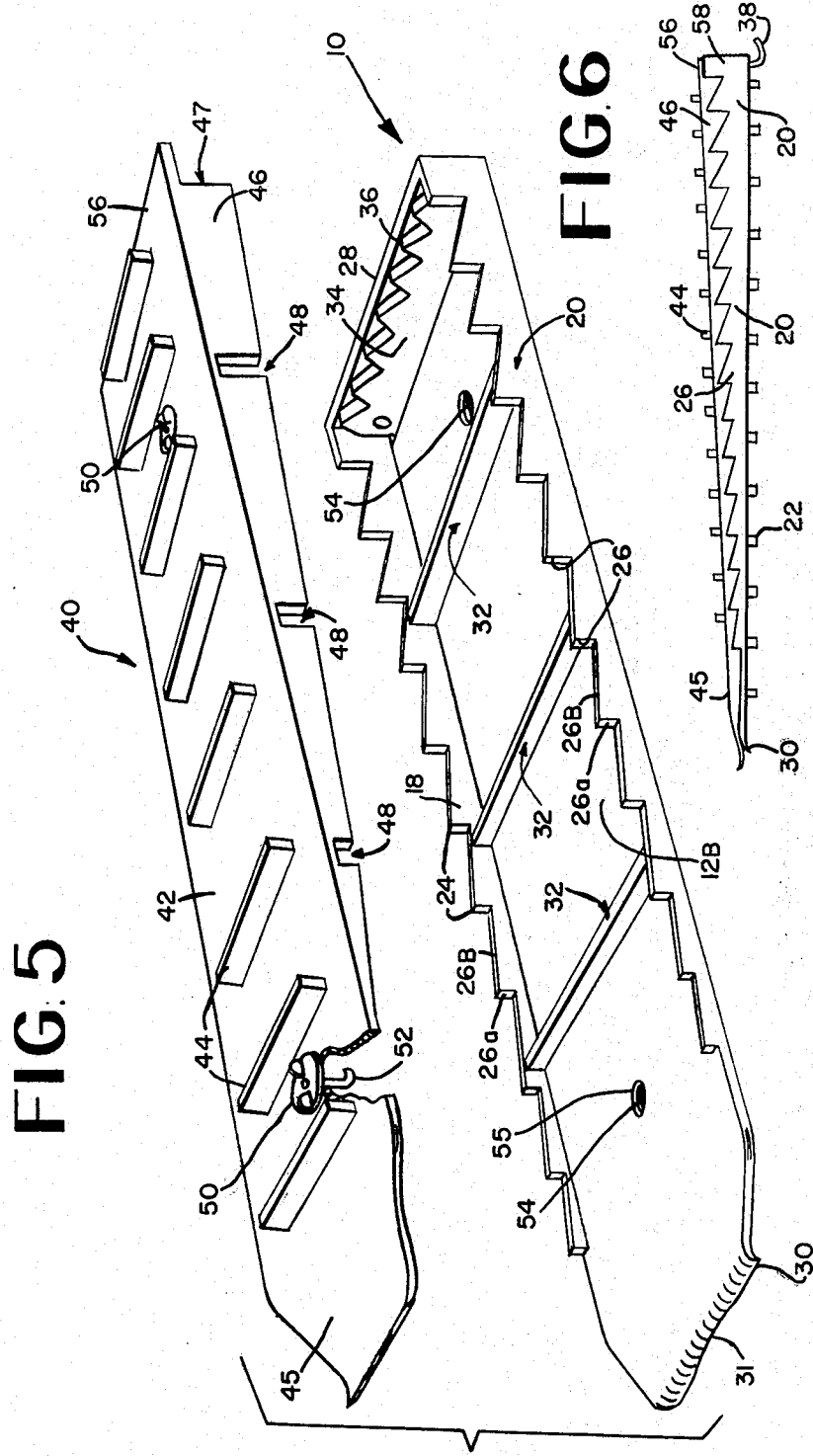

ICE AND SNOW GRIP FOR VEHICLES

FIELD OF THE INVENTION

The present invention relates to an ice-gripping and snow-traction device which may be inserted between the tire of a motor vehicle and the surface of an ice and/or snow covered roadway.

BACKGROUND OF THE INVENTION

Various devices have been proposed to provide traction for the wheels of vehicles when stalled because of ice or snow on a roadway. Such devices have usually resulted in failure, due to a number of reasons. One of them is that most devices will function satisfactorily in snow or on ice but will not be adapted to both conditions, that is, provide adequate gripping action in deep soft snow as well as on icy surfaces. Also, it has been observed that, due to the high torque transmitted to a spinning drive wheels, in most cases the device fails to grip, slides between tire and roadway and is projected with force behind the vehicle resulting in a dangerous hasard when used. This is caused by a lack of sufficient gripping faces on the grip.

It is therefore essential to provide on a grip the maximum numbers of gripping faces. Applicant has therefore realized that, as the grip member is forced into snow or ice, additional portions of the device may be used to enhance the gripping action.

STATEMENT OF THE INVENTION

It is an object of the present invention to provide an ice and snow grip which overcomes the disadvantages of prior snow or ice gripping devices by providing all ground-contacting surfaces of the grip with a gripping effect.

It is also an object of this invention to provide an ice and snow grip which is adapted to operate satisfactorily on an icy surface as well as in deep snow.

It is a further object of this invention to provide a snow and ice grip which may be easily carried and quickly placed between the wheel of a vehicle and the roadway.

The present invention therefore provides an ice and snow grip for a tire of a motor vehicle which comprises an elongated body having a ramp portion, a nose portion and two parallel sidewalls extending at opposite sides of the ramp portion and tapering to the nose portion; a first series of transverse projections longitudinally spaced along one face of the ramp portion; a series of teeth longitudinally spaced along each edge of each sidewall; and a second series of longitudinally spaced transverse projections on the opposite face of the ramp portion for adding to the gripping effect of the teeth.

When the grip member is to be used on an icy surface, the top wall of the ramp portion becomes an inclined tirereceiving face and the first series of transverse projections provide contact between the grip and the tire.

When the grip member is to be used in deep soft snow, the grip is inverted and a second similarly-shaped elongated body is received in an area defined by the sidewalls and the under face of the ramp portion. The ramp of this second elongated body provides the gripping action to the tire while the ramp portion of the first elongated body serves as a tract in the soft snow.

DESCRIPTION OF THE DRAWINGS

Other objects and characteristic features of the present invention will be in part obvious from the accompanying drawings, and in part pointed out as the description of the invention progresses. In describing the invention in detail, reference will be amde to the accompanying drawings, in which like reference characters designate corresponding parts throughout the several views and in which:

FIG. 5 is a perspective exploded view of the grip illustrated in FIG. 1 but in inverted position and in combination with a similar-shaped grip for use in deep soft snow; and FIG. 6 is a side elevation of the assembled grip shown in FIG. 5.

DESCRIPTION OF THE PREFERRED EMBODIMENTS

Figure 1:
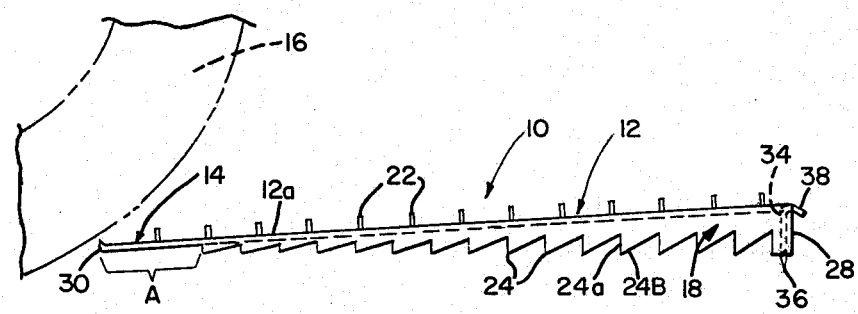
FIG. 1 is a side elevation of the ice grip shown in position engaged before engagement with a tire.
Figure 2:
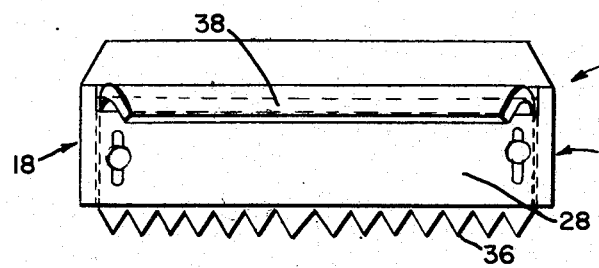
FIG. 2 is an end view as seen from the right of FIG. 1.
Figure 3:
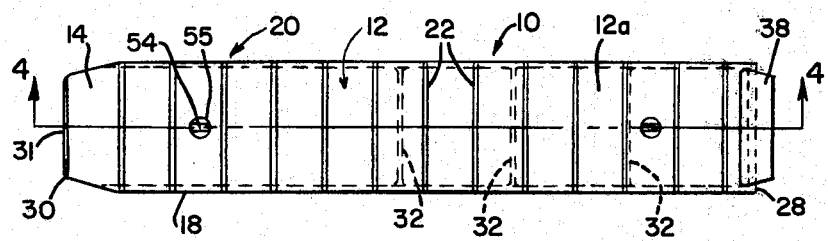
FIG. 3 is a plan view of the grip shown in FIG. 1.

Referring to FIGS. 1–4 of the drawings, there is shown a grip made in accordance with the present invention and consisting of an elongated body 10 having a ramp portion 12, a nose portion 14 adapted to be inserted between a tire 16 of a motor vehicle and the surface of a roadway, and two parallel sidewalls 18 and 20 extending at opposite sides of the ramp portion and tapering to the nose portion. The ramp portion 12 has an upper face 12a and an under face 12b. The width of the ramp portion 12 is slightly smaller than the width of a tire so that the body may be received in the rut of the tire. A first series of transverse tire gripping projections 22 are equi-distantly spaced longitudinally along the upper face 12a. These projections are upright abutments extending preferably perpendicularly to the upper face 12a to provide maximum gripping engagement with the tire 16.

Figure 4:
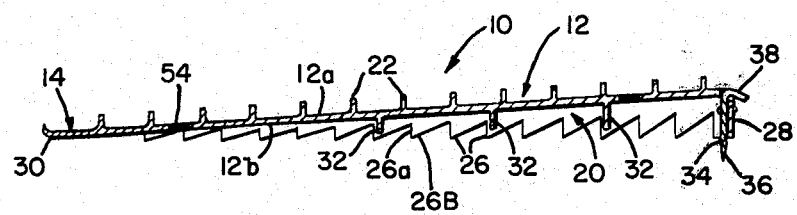
FIG. 4 is a cross-sectional view taken along lines 4—4 of FIG. 3.

Extending along the entire length of the lower edge of each sidewall 18, 20, a series of ground-engaging teeth 24, 26 are provided, each being formed by two converging surfaces 24a, 24b and 26a, 26b. Referring more particularly to FIGS. 1 and 4, surfaces 24a and 26a extend substantially vertically when the grip is placed in a horizontal plane as shown in the drawings. The converging point of the tooth surfaces are preferably in a common plane extending from the end wall 28 to the nose extremity 30. This extremity has a concave face 31 for easy engagement with tire 16.

Disposed transversely on the under face 12b of the ramp portion, a second series of ground-engaging projections of varying lengths are longitudinally spaced therealong. Preferably, the lower edge of each projection 32 should be included in a common plane extending from the end wall 28 to the nose extremity 30. These projections 32 are intended to come into engagement with the snow and/or ice when the weight exerted by the wheel has caused teeth 24 and 26 to penetrate into the ice or snow and additional gripping action is needed. This will prevent sidewalls 18 and 20 to slide in grooves which they may have formed in the ice as a result of the teeth chipping in the ice.

In one preferred form of the invention, the end wall 28 is further provided with a vertical slide 34 movably mounted thereto and provided, at its lower edge, with a series of teeth 36, and at its upper edge, with a rearwardly and downwardly inclined slope which follows the movement of the wheel off the ramp portion.

The operation of the grip 10 will now be given with reference to FIGS. 1–4 when the grip is to be used on an icy surface. A pair of grip members 10 are inserted between the two drive wheels of the vehicle and the icy surface. As the wheels are slowly driven, grips 10 are drawn beneath the tires forcing the teeth 24 and 26 of each grip to chip into the icy surface. At the same time, the tire begins to roll on the top face 12a of the ramp portion. As the weight of the tire is felt by the grip, the latter is urged to penetrate the icy surface. Hence, should the grip 10 begin to slide on the icy surface, this movement will be resisted by the engagement of the transverse projections 32 against this surface. As the tire reaches the top of the inclined ramp, the presence of teeth 36 on slide 34 will prevent the spinning off of the grip as the wheel moves down slope 38.

In the preferred embodiment of the invention, it is also desirable that the side walls 18 and 20 extending from nose 30 have a section thereof without teeth between the nose 30 and the first teeth 24, 26. This is section A in FIG. 1 of the drawings. Such a construction has the advantage of facilitating the gripping action between the wheel 16 and the projections 22. When a skidding wheel 16 engages the nose portion 30, the grip device advances toward the wheel resulting in engagement between the wheel and the first projection 22. If teeth were provided on side walls 18 and 20 before engagement of the wheel with the first projection 22, wheel 16 would skid on the nose portion, and the teeth would delay the gripping action between wheel 16 and projections 22.

An important advantage of the grip of the present invention is that it can also bo used when a vehicle is in a deep soft snow. In this case, the grip 10 illustrated in FIGS. 1–4 is inverted (see FIG. 5) and receives within walls 18, 20 and 28, a second similarly-shaped elongated body 40. This grip 40 has an inclined ramp 42 on which is provided in a series of longitudinally spaced transverse tire-gripping projections 44. A nose 45 is also provided together with two sidewalls (one of which is shown as 46) tapering from an end wall 47 to the nose portion 45. A series of notches 48 are provided at the lower edge of each sidewall 46 and correspond in number and in shape to projections 32 of grip 10 so that they may easily engage these projections To lock the grip 40 to the grip 10, locking means are provided and may consist of rotatable circular piece 50 to which is integrally mounted a finger 52, the lower end of which is adapted to extend through a slot 54 of a circular seat 55 provided in the ramp portion 12 of the grip 10.

The end wall 47 has a extension 56 which comes in overlying arrangement with slide 34 to prevent the teeth 36 from extending above the plane of the ramp 42.

When the grip 10 is to be used in deep soft snow, it is combined with grip 40. Both grips are locked together and nose 45 is inserted between the tire and the snow. Projections 22 of grip 10 become snow-tracting members while projections 44 provide the tire-gripping action.

Although the invention has been described above in relation to specific forms of the invention, it will be evident to the man skilled in the art that it may be refined and modified in various ways. For example, to provide additional gripping action on an icy surface, the distance separating sidewalls 18 and 20 could be made gradually smaller from nose portion 14 to the end wall 28; hence, in not being aligned, the series of teeth 24, 26 increase the gripping surface of the sidewalls. It is therefore wished to have it understood that the present invention is not limited in interpretation except by the terms of the following claims.

What I claimed is:

1. An ice and snow grip for a tire on a motor vehicle, comprising:
    an elongated body including an inclined ramp portion, a nose portion at the lower end of said ramp portion for insertion under said tire and two parallel sidewalls downwardly extending at opposite sides of said ramp portion and tapering to said nose portion,
    said ramp portion having tire-receiving upper face and an under face,
    a first series of transverse tire-gripping projections spaced longitudinally along said upper face,
    a series of ground-engaging teeth defined longitudinally along the lower edge of each said sidewall,
    a second series of transverse projections spaced longitudinally along said under face for further gripping in snow and ice, and
    a slide movably mounted to an end wall opposite to said nose portion, a series of teeth being provided at the lower edge of said slide for further gripping action in snow and ice.

2. A grip as defined in claim 1 wherein said ramp portion sidewalls are free of teeth along the lower edge thereof from said wall portion to the first tooth for a length greater than the distance of said nose portion to first of said series of transverse tire gripping projections spaced longitudinally along said upper face.

3. A grip device as defined in claim 1, wherein said transverse projections of said second series extend from one sidewall to the opposite sidewall of said elongated body.

4. A grip device as defined in claim 1, wherein said projections of said first series are upright abutments disposed perpendicularly to the plane of said upper face of said ramp portion.

5. A grip device as defined in claim 1, wherein said nose portion has an upturned extremity for easy insertion beneath said tire.

6. A grip device as defined in claim 5, wherein said extremity has a concave upper surface for further gripping engagement with said tire.

7. A grip device as defined in claim 1, wherein said slide has a downwardly and rearwardly inclined upper edge extending away from said ramp portion.

8. An ice and snow grip for a tire on a motor vehicle comprising:
    an elongated body including a ramp portion, a nose portion at one end of said ramp portion and two parallel sidewalls extending at opposite sides of said ramp portion and tapering to said nose portion,
    a first series of transverse projections spaced longitudinally along one face of said ramp portion, a series of teeth defined longitudinally along the free edge of each said sidewall, a second series of transverse projections spaced longitudinally along the opposite face of said ramp portion, a second elongate body received in an area defined by said sidewalls, said opposite face and an end wall opposite said nose portion, said second elongated body having an inclined ramp, a nose at the lower end of said ramp and two parallel sidewalls downwardly extending at opposite sides of said ramp and tapering to said nose, said ramp of said second elongated body having a tire-receiving upper wall and a series of transverse tiregripping projections spaced longitudinally along said upper wall, and each sidewall of said second elongated body having a series of notches longitudinally spaced at the lower edge thereof for correspondingly receiving said transverse projections of said second series.

9. A grip device as defined in claim 8, further comprising means for locking said second elongated body in assembly with said first-mentioned elongated body whereby the ramp portion of said first elongated body serves as a traction device in snow and the ramp of said second elongated body serves as a tire-gripping member.

10. A grip device as defined in claim 9, said ramp having an extension overhanging a toothed slide movably mounted to said end wall of said first elongated body.

* * * * *